US012725088B1

(12) United States Patent
Pattanaik et al.

(10) Patent No.: US 12,725,088 B1
(45) Date of Patent: Sep. 1, 2026

(54) ITERATIVE GENERATIVE ARTIFICIAL INTELLIGENCE PROMPT AND TRAINING DATA IMPROVEMENT

(71) Applicant: The Bank of New York Mellon, New York, NY (US)

(72) Inventors: Sarthak Pattanaik, New York, NY (US); Vadim Pertsovskiy, Chicago, IL (US); Madhusudan Rana, Lake Mary, FL (US); Filipe Joao Cabrita Condessa, Pittsburgh, PA (US); Zachariah Tyree, New York, NY (US); Vanessa Vidic, Pittsburgh, PA (US); Nikunj Bhalla, Pune (IN); Shaik Abdur Rahman Nawaz, Pune (IN)

(73) Assignee: THE BANK OF NEW YORK MELLON, New York, NY (US)

( * ) Notice: Subject to any disclaimer, the term of this patent is extended or adjusted under 35 U.S.C. 154(b) by 0 days.

(21) Appl. No.: 19/351,186

(22) Filed: Oct. 6, 2025

(51) Int. Cl.
*G06N 3/0475* (2023.01)
*G06N 20/00* (2019.01)

(52) U.S. Cl.
CPC ........... *G06N 20/00* (2019.01); *G06N 3/0475* (2023.01)

(58) Field of Classification Search
CPC ...................................................... G06N 20/00
See application file for complete search history.

(56) References Cited

U.S. PATENT DOCUMENTS

| | | | | |
|---|---|---|---|---|
| 12,481,651 | B1 * | 11/2025 | Cohen | G06F 16/243 |
| 2025/0245577 | A1 * | 7/2025 | Esmaeili | G06N 20/20 |
| 2025/0322294 | A1 * | 10/2025 | Sankar | G06N 3/045 |
| 2026/0044511 | A1 * | 2/2026 | Zawideh | G06F 16/24553 |

OTHER PUBLICATIONS

Liu, Yuanye, et al. "Beyond Prompt Content: Enhancing LLM Performance via Content-Format Integrated Prompt Optimization." arXiv preprint arXiv:2502.04295 (2025). (Year: 2025).*

Lu, Yung-En, and Shin-Jie Lee. "Prompt Optimization with Human Annotations Using Pairwise Comparison." 2024 IEEE International Conference on e-Business Engineering (ICEBE). IEEE, 2024. (Year: 2024).*

* cited by examiner

*Primary Examiner* — Hal Schnee
(74) *Attorney, Agent, or Firm* — NORTON ROSE FULBRIGHT US LLP

(57) ABSTRACT

Systems, methods, and computer-readable storage media for generative artificial intelligence prompt and training data improvement are disclosed. Prompt and data improvement may be achieved through an iterative process. An example method by one or more processors may include receiving a first prompt for a generative artificial intelligence (AI) application; receiving one or more evaluation inputs; determining a performance of the first prompt based on the one or more evaluation inputs; and generating a second prompt based on the first prompt and the determined performance of the first prompt.

20 Claims, 6 Drawing Sheets

ITERATIVE GENERATIVE ARTIFICIAL INTELLIGENCE PROMPT AND TRAINING DATA IMPROVEMENT

FIELD OF THE DISCLOSURE

The instant disclosure relates to generative artificial intelligence (AI) and more particularly to systems and methods for generative AI prompt and training data improvement.

BACKGROUND

Generative AI applications are powerful tools for enhancing organizational efficiency and productivity. Such applications provide a variety of different functions such as analysis and distillation of data, plain language answers to plain language prompts across a wide array of subject matter areas, and other functions. One example of a generative AI application is a natural language processing (NLP) application, and one example of a NLP application is a large language model (LLM). LLMs are capable of receiving input in the form of plain language prompts and generating an output based on the input. Generative AI applications in general, and LLMs in particular, are implemented in a wide range of contexts, including analyzing medical records and data, reviewing and maintaining software libraries, analyzing transaction data, and evaluating workflow processes.

Performance of generative AI applications, such as LLMs, may depend, in part, on a quality of prompts entered into the applications. For example, well-written prompts may result in outputs containing correct content in a correct format, while poorly written prompts may result in outputs that include deficiencies in format and/or content.

Shortcomings mentioned here are only representative and are included simply to highlight that a need exists for improved generative AI prompt and training data improvement. Embodiments described herein address certain shortcomings but not necessarily each and every one described here or known in the art. Furthermore, embodiments described herein may present other benefits than, and be used in other applications than, those of the shortcomings described above.

SUMMARY

Iterative prompt improvement, such as iterative prompt optimization, can assist users and/or generative artificial intelligence (AI) applications in crafting prompts for generative AI applications, such as large language models (LLMs), that will result in desired format and content of outputs. For example, a prompt entered into a generative AI application may be compared against evaluation inputs, such as prompts, associated outputs, and/or task descriptions, to determine a performance of the prompt. An improved prompt, more likely to result in desired output content and/or format, may be generated based on the determined performance and the input prompt. The enhanced prompts may then be evaluated for performance and used to generate further enhanced prompts. The prompt improvement process may be iterated until a threshold prompt performance level is achieved.

To further enhance prompt improvement, particularly in scenarios with limited training data availability, mock training data may be generated and used in prompt performance evaluation. For example, an improved prompt may be generated using the mock data. Once an improved prompt is generated that achieves a threshold performance level, based on evaluation using the mock training data, a performance of the improved prompt may be evaluated using the limited labeled training data set. Based on the evaluation of the performance of the improved prompt using the limited labeled training data set, an improved mock training data set may be generated, and the prompt may be further improved through evaluation of the prompt using the improved mock training data set.

A method may include receiving, by one or more processors, a first prompt for a generative artificial intelligence (AI) application. The generative AI application may, for example, include a large language model (LLM) application, the first prompt may include a first LLM prompt, and the second prompt may include a second LLM prompt.

The one or more processors may also receive one or more evaluation inputs. The one or more processors may determine a performance of the first prompt based on the one or more evaluation inputs, such as by evaluating outputs of the first prompt when the first prompt is provided to the generative AI application or another generative AI application. The one or more evaluation inputs may include a third prompt and a first set of one or more outputs associated with the third prompt. Determining the performance of the first prompt may include generating, by the one or more processors, a second set of one or more outputs of the generative AI application based on the first prompt, comparing, by the one or more processors, a first content of the first set of one or more outputs with a second content of the second set of one or more outputs; and comparing, by the one or more processors, a first format of the first set of one or more outputs with a second format of the second set of one or more outputs.

The one or more processors may generate a second prompt based on the first prompt and the determined performance of the first prompt. For example, the one or more processors may generate a second prompt that is expected to result in performance that is superior to performance of the first prompt. The second prompt may, for example, be an improved version of the first prompt.

In some examples, the one or more evaluation inputs may include mock training data, and receiving the one or more evaluation inputs may include generating the mock training data. In some examples, the mock training data may be refined or updated to be more useful in improving prompt quality. For example, the method may include determining, by the one or more processors determining, by the one or more processors, a first performance of the second prompt, based on the mock training data, exceeds a threshold level, determining, by the one or more processors, a second performance of the second prompt based on one or more additional evaluation inputs based on the determination that the first performance of the second prompt exceeds the threshold level, and updating, by the one or more processors, the mock training data based on the determined second performance. In some examples, the one or more additional evaluation inputs may include labeled training data.

In some examples, a system may include a memory and one or more processors communicatively coupled to the memory and configured to perform the operations described herein. In some examples, a non-transitory computer-readable storage medium may store instructions that, when executed by one or more processors, cause the one or more processors to perform the operations described herein.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Quality of outputs of a generative artificial intelligence (AI) application, such as an large language model (LLM), often depends, at least in part, on a quality of a prompt entered into the generative AI application. Iterative prompt improvement may allow a generative AI application to improve on an input prompt of the generative AI application or another generative AI application, such as a prompt entered by a user, to result in improved outputs, such as outputs having a desired content and format. High quality training data for improvement of such prompts may be limited. Use of an iterative process to improve artificial testing data for prompt improvement may further aid in tailoring prompts to produce a desired format and content of generative AI outputs, particularly in scenarios where high quality training data sets are limited.

Figures 1, 2:
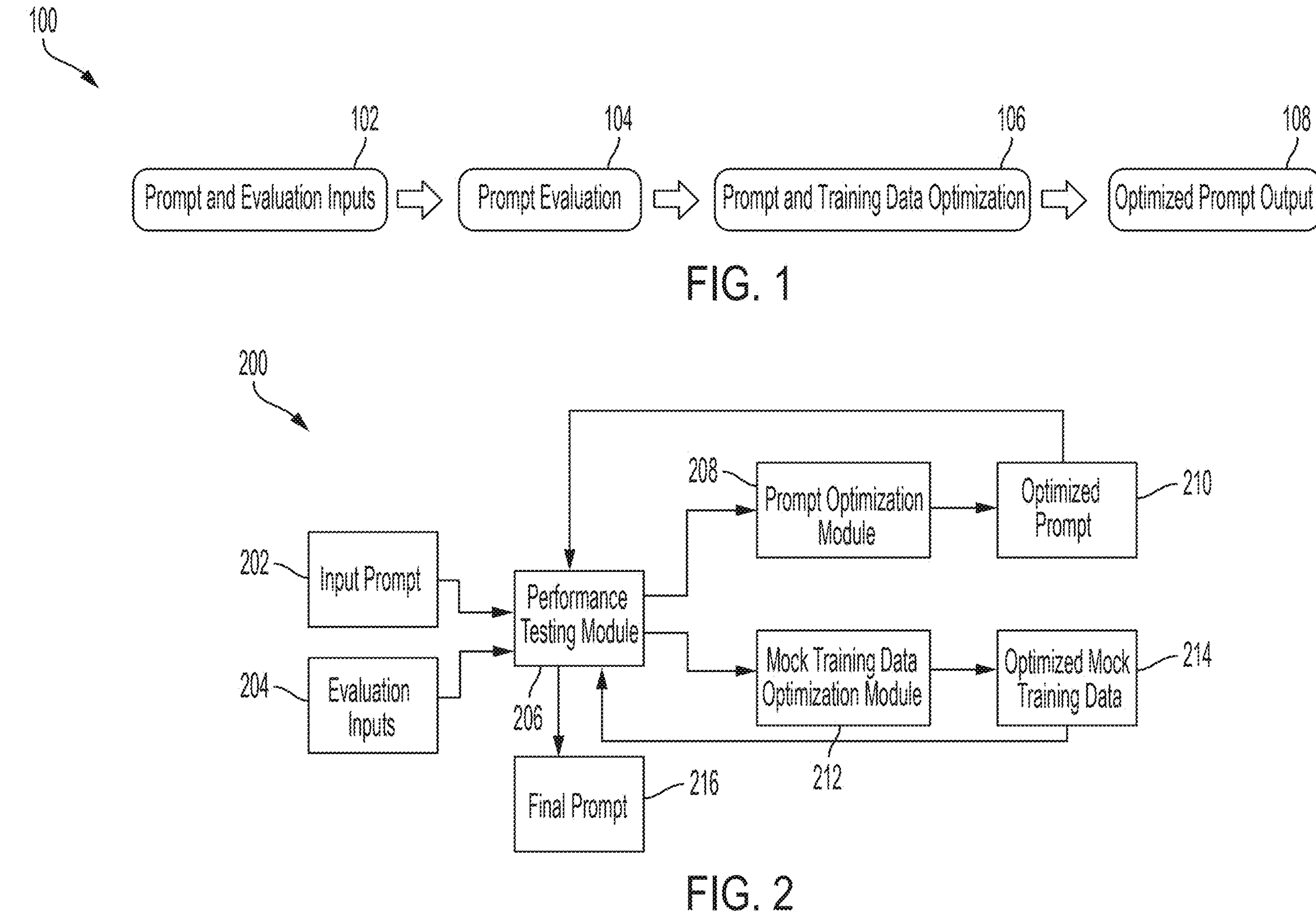
FIG. 1 is a flow chart of an example method for generative AI prompt improvement according to some embodiments of the disclosure.
FIG. 2 is a block diagram of a prompt and training data improvement system according to some embodiments of the disclosure.

A flow chart 100 of an example process for generative AI prompt and training data improvement is shown in FIG. 1. The operations described with respect to FIG. 1 may be performed by a generative AI application to which one or more prompts are input and/or an agent of the generative AI application. At block 102, an input prompt and one or more evaluation inputs may be received. For example, the prompt may be a prompt for an LLM input by a user, a prompt accessed from a database, a prompt generated by a generative AI application, or a prompt received from another source. The evaluation inputs may include labeled data, such as example prompts and example outputs associated with the example prompts, artificially generated mock example prompts and mock example outputs, or other evaluation inputs.

At block 104, the input prompt may be evaluated to determine a quality of the input prompt. For example, the prompt may be provided to the generative AI application and one or more outputs may be generated based on the prompt. A quality of the outputs generated based on the prompt may be judged using the evaluation inputs. As one example, a format of the output and a content of the output may be compared against one or more example outputs of the evaluation data. Further, the input prompt may be compared against one or more example prompts of the evaluation data. Based on the comparison(s), a prompt quality score may be assigned to the input prompt. The score may, for example, be an integer or scalar value, with a higher score representing a closer correlation between the prompt and a desired format and/or content of output and a lower score representing a lower correlation between the prompt and a desired format and/or content of output. As another example, a prompt may be categorized as optimized/high quality, or not optimized/low quality. If the prompt meets a quality threshold, such as having a score higher than a threshold value or being categorized as optimized/high quality, the outputs of the generative AI application may be provided to a user, and further prompt optimization may be avoided. The prompt and training data improvement operations at block 106 may be skipped in such a scenario, and the prompt may be considered optimized and output at block 108.

If the prompt fails to meet a quality threshold, such as having a score lower than a threshold value or being categorized as not optimized/low quality, prompt training and/or data optimization may be performed at block 106. For example, a new prompt may be generated based on the input prompt received at block 102, the evaluation inputs received at block 102, and the prompt evaluation performed at block 104. The new prompt may, for example, be an improved prompt, rewritten to obtain a higher prompt quality score than the input prompt on which the improved prompt was generated. Prompt evaluation may be performed on the new prompt at block 104, and, if the new prompt meets an evaluation threshold, such as having a score that exceeds a threshold and/or a quality categorization that meets a quality categorization requirement, the new prompt may be considered improved and may be output at block 108. If the new prompt is determined not to meet a quality threshold, the operations at blocks 104 and 106 may be repeated until a prompt is generated that meets the quality threshold. Training data, such as artificially generated prompts, and associated generative AI application outputs may similarly be improved, to facilitate enhanced prompt evaluation at block 104 and may be used in future prompt evaluations at block 104 to further improve input prompts or new prompts generated by prompt and training data optimization block 106. Thus, an iterative process may be applied to both prompt optimization and artificial training data generation used in prompt optimization to iterate improved prompts until a prompt quality threshold is met.

A block diagram 200 of an example system for generative AI prompt improvement is shown in FIG. 2. The system of FIG. 2 may, for example, be implemented by a generative AI application and/or an agent of a generative AI application to improve prompts entered into and/or provided for the generative AI application. An input prompt receipt module 202 may receive an input prompt, such as an input prompt entered by a user into an LLM application. Alternatively, the input prompt receipt module 202 may receive input prompts from another source, such as by accessing a database of input prompts or other storage housing input prompts, or by generating an input prompt. An evaluation inputs receipt module 204 may likewise receive evaluation inputs for evaluating input prompts. In some examples, the evaluation inputs receipt module may receive labeled training data, such as one or more training prompts and data associated with the one or more training prompts, such as example outputs having a desired format and content associated with the example training prompts. In some examples, such as when labeled training data is limited, the evaluation input receipt module 204 may generate, or receive generated, mock training data, such as one or more mock example prompts and one or more mock example outputs associated with the example mock prompts. Such mock training data may be generated by a mock data generator. In examples where training data is limited, the evaluation input receipt module may both receive limited labeled training data, such as example prompts and associated outputs, and generate mock data. In some examples, the evaluation inputs received by evaluation input receipt module 204 may include a task description of a task to be performed by the input prompt received at input prompt receipt module 202.

A performance testing module 206 may receive the input prompt from input prompt receipt module 202 and one or more evaluation inputs from evaluation input receipt module 204. The performance testing module 206 may execute an evaluation function, F, to evaluate the input prompt. For example, the performance testing module 206 may compare the input prompt against one or more example prompts of the evaluation input data and/or compare one or more outputs generated by the generative AI application based on the input prompt, or one or more outputs predicted to be generated by the generative AI application based on the input prompt, against one or more example outputs of the example training data. In some examples, the performance testing module may compare a format and/or a content of an output of the generative AI application associated with the input prompt with a format and/or a content of one or more example outputs of the evaluation inputs. Such comparison may include assessing a predicted output of the input prompt against one or more ground truth labels. In some examples, a task description may also be received by the performance testing module 206 and may be used in testing and/or evaluating the performance of the input prompt. Based on analysis of the input prompt, the performance testing module 206 may assign a quality score and/or a quality category to the input prompt. For example, if a format and/or content of output generated by the generative AI application based on the input prompt, or predicted to be generated by the generative AI application based on the input prompt, is close to or matches a desired format and/or content of the output, as determined based on the evaluation inputs which may include example outputs and/or a task description, a high score and/or quality categorization may be assigned to the input prompt. Alternatively, if a format and/or content of output generated by the generative AI application based on the input prompt, or predicted to be generated by the generative AI application based on the input prompt, differs substantially from a desired format and/or content of the output, as determined based on the evaluation inputs which may include example outputs and/or a task description, a low score and/or quality categorization may be assigned to the input prompt. Thus, a quality score and/or categorization assigned to a prompt may depend on how closely a content and/or format of one or more outputs or predicted outputs associated with the prompt match a desired content and/or format, as determined based on the evaluation inputs. If a quality score of the prompt exceeds a threshold level and/or a quality categorization of the prompt matches a required quality categorization, a final prompt output module 216 may output the prompt, such as outputting the prompt to the generative AI application, for generation of outputs based on the prompt, and/or displaying the prompt for the user.

In some examples, the performance testing module 206 may determine a quality of the input prompt by performing a single evaluation, such as a single determination of a quality score of the prompt. Such an evaluation may include determination of whether the input prompt is a best possible prompt or whether an improved prompt could be generated. In some examples, the performance testing module 206 may run multiple quality analysis iterations on the input prompt, such as through generation of multiple quality scores for the same input prompt. The performance testing module 206 may average the multiple quality scores generated for the input prompt and may compare the average against the quality score threshold to determine whether to output the prompt or to generate an improved version of the prompt. In some examples, a mutation rate between multiple prompts, such as the input prompt and/or one or more improved versions of the input prompt, may be determined by the performance testing module 206. The mutation rate may, for example, indicate a change in prompt structure and/or a change in quality scores generated across multiple iterations of the prompt improvement process performed by the performance testing module. If the mutation rate is determined to fall below a threshold mutation rate, the performance testing module 206 may determine to output the prompt using the final prompt output module 216, given prompt improvement has slowed. If the mutation rate is above a threshold level, the performance testing module may determine that additional prompt improvement may be possible and a further improved prompt may be generated using the prompt optimization module. In some examples, a Monte Carlo Tree Search may be used in determining a performance of the input prompt. In some examples, the performance testing module 206 may accept user input regarding a criteria for determining whether a prompt has been sufficiently improved. For example, when a criteria input by a user is determined to be met by either an input prompt or an improved version of an input prompt, the performance testing module 206 may instruct the final prompt output module 216 to output the prompt.

In some examples, the performance testing module 206 may be set up to continuously evaluate a best prompt previously generated against newly generated prompts, generated using the prompt optimization module 208. For example, if the prompt optimization module 208 generates a prompt having worse performance, such as evidenced by a lower quality score, than a previously input or generated prompt, the prompt optimization module 208 may revert to the prompt having the best performance over the newly generated improved prompt and may instruct the prompt optimization module to generate a new improved prompt based on the prompt having the best performance thus far and, in some examples, based on the failure of performance of the improved prompt determined to have worse performance. For example, suboptimal improved prompts may be retained in a context for a predetermined period of time or a predetermined number of iterations of the prompt optimization module 208 and the performance testing module 206 to allow the performance testing module 206 and the prompt optimization module 208 to leverage the reduced performance of the suboptimal prompt. In some examples, a linear hill climbing strategy may be implemented for prompt improvement by incorporating multiple evolution lines simultaneously and using an upper confidence bound Monte Carlo Tree Search (UCB-MCTS) to handle exploration/exploration trade-offs involved in generation of improved prompts.

In some examples, the function F, implemented by the performance testing module 206 may be defined based on performance metrics set by a user. For example, the function F may be a measurement function defined to determine an F1 classification task score of the prompt. For example, a user may set the F1 classification task score to 95%, and the performance testing module 206 may instruct the prompt optimization module 208 to generate an improved prompt if an F1 classification task score for the prompt is below 95%. As another example, the function F may be a measurement function defined to determine a top-3 retrieval performance score. For example, a user may set the top-3 retrieval performance score to 90%, and the performance testing module 206 may instruct the prompt optimization module 208 to generate an improved prompt if a top-3 retrieval performance score for the prompt is below 90%. In some examples, multiple constraints on prompt performance may be implemented. For example, the performance testing module 206 and the prompt improvement module 208 may be configured to iterate and generate improved prompts until a prompt that meets a 95% F1 score and a 99% precision of outcomes on a subclass of problems is achieved. In such examples multiple F measurement functions can be implemented to guide a hill-climbing process beyond a naive approach, through implementation of an elastic penalty on how far from each of the targets a generated improved prompt is to promote fulfilling all conditions in a minimal number of iterations.

If a quality score of the prompt is below a threshold level and/or a quality categorization of the prompt does not match a required quality categorization, the performance testing module 206 may determine that the input prompt should be further improved. The performance testing module 206 may provide the input prompt, prompt performance information, such as a prompt quality score, and, in some examples, the evaluation inputs to the prompt optimization module 208. The prompt optimization module 208 may generate an improved prompt 210, predicted to have a higher prompt quality score, based on the input prompt, the prompt performance information, and/or the evaluation inputs. In some examples, the improved prompt 210 may be an enhanced or optimized version of the input prompt received by the input prompt receipt module 202. The improved prompt 210 may then be provided to performance testing module 206, for subsequent performance testing as described herein. Based on a prompt quality score and/or categorization assigned to the improved prompt, the improved prompt may be output by final prompt output module 216, or provided to prompt optimization module 208 for further improvement, in an iterative process. Thus, an input prompt may be refined over multiple iterations of testing by the performance testing module 206 and prompt improvement by prompt optimization module 208 until a threshold prompt quality level is achieved.

In scenarios where training data, such as labeled training data, is limited, the performance testing module 206 may further evaluate performance of mock training data generated by the evaluation input receipt module 204, or another module. As one particular example, an input prompt may be passed through the iterative process described with respect to blocks 206, 208, and 210, using generated mock training data, until a prompt performance threshold is met, such as a threshold quality score or categorization. Once the threshold quality score or categorization is met, the performance testing module 206 may test a performance of the prompt using a limited labeled training data set received by the evaluation input receipt module 204. If the improved prompt generated using the mock training data meets a threshold performance requirement when evaluated using the limited labeled training data set, such as a threshold quality score or categorization, the prompt and/or mock data set may be output at the final prompt output module 216. In some aspects, the mock training data may be further refined and/or improved by the mock training data optimization module 212 based on the improved prompt generated using the mock training data meeting the threshold performance requirement when evaluated using the limited labeled training data set.

If the improved prompt does not meet the threshold performance requirement when evaluated using the limited labeled training data set, the mock training data may be provided to the mock training data optimization module 212, along with performance evaluation information, the limited labeled training data, and/or the improved prompt. The mock training data optimization module 212 may generate improved mock training data 214 based on the information received from the performance testing module and may provide the mock training data 214 to the performance testing module 206. The performance testing module 206 may then perform performance testing on the improved prompt, that previously met the performance threshold, using the improved mock training data, and may proceed, again, through the iterative process of further improving the prompt in conjunction with blocks 208 and 210. In successive iterations, the improved prompt and the improved training data may be further improved until the prompt is judged to meet a performance threshold when evaluated against the limited labeled training data set. Once the improved prompt meets the performance threshold when evaluated against the limited labeled training data set, the improved prompt and, in some examples, the improved mock training data, may be output at final prompt output module 216.

Thus, the system of block diagram 200 may operate in two example modes. In a first example mode, abundant labeled training data is provided to the evaluation input receipt module 204. In a second example mode, limited labeled training data is provided to the evaluation input receipt module. For example, in scenarios where sufficient labeled training data is received, modules 212 and 214 of the system 200 may be deactivated, and the system may generate an improved prompt, using the labeled training data and without generating and/or using mock training data. A sufficient or abundant amount of labeled data may, for example, be an amount of labeled training data that exceeds a threshold level. As another example, whether there is sufficient or abundant labeled data may be flagged by a user requesting prompt improvement or may be determined based on an amount of labeled training data associated with a subject matter area or application of the prompt. In scenarios where sufficient labeled training data is not received, modules 212 and 214 may be activated to allow for improvement of generated mock training data. Thus, through a recursive refinement process both a prompt and mock data may be improved through iterative feedback loops, yielding precise, high quality prompt tuning. Furthermore, this adaptability to accommodate both scenarios with abundant labeled training data and limited labeled training data may enhance prompt robustness and applicability across a diverse range of domains, and the continuous enhancement of mock data generation may provide a safeguard against overfitting, a common problem encountered when working with limited labeled training data. The prompt improvement described herein may enhance efficiency in prompt engineering, through reducing a requirement for human input, accelerate generative AI and LLM deployment, and enhance generative AI and LLM reliability across a wide array of applications.

In some examples, the prompt optimization module 208 may be executed by a first generative AI agent, such as a prompt generation agent. In some examples, the prompt generation agent may also initialize or generate the input prompt received by input prompt module 202. The performance testing module 206 may be executed by a second generative AI agent. In some examples, the final prompt output module 216 may be a prompt execution module for providing the final prompt to a generative AI application, such as an LLM, for performing one or more tasks. For example, the final prompt may be executed to perform one or more matching tasks on data, such as through execution of one or more rules on an input data set to perform one or more matching tasks on the data.

Figure 3:
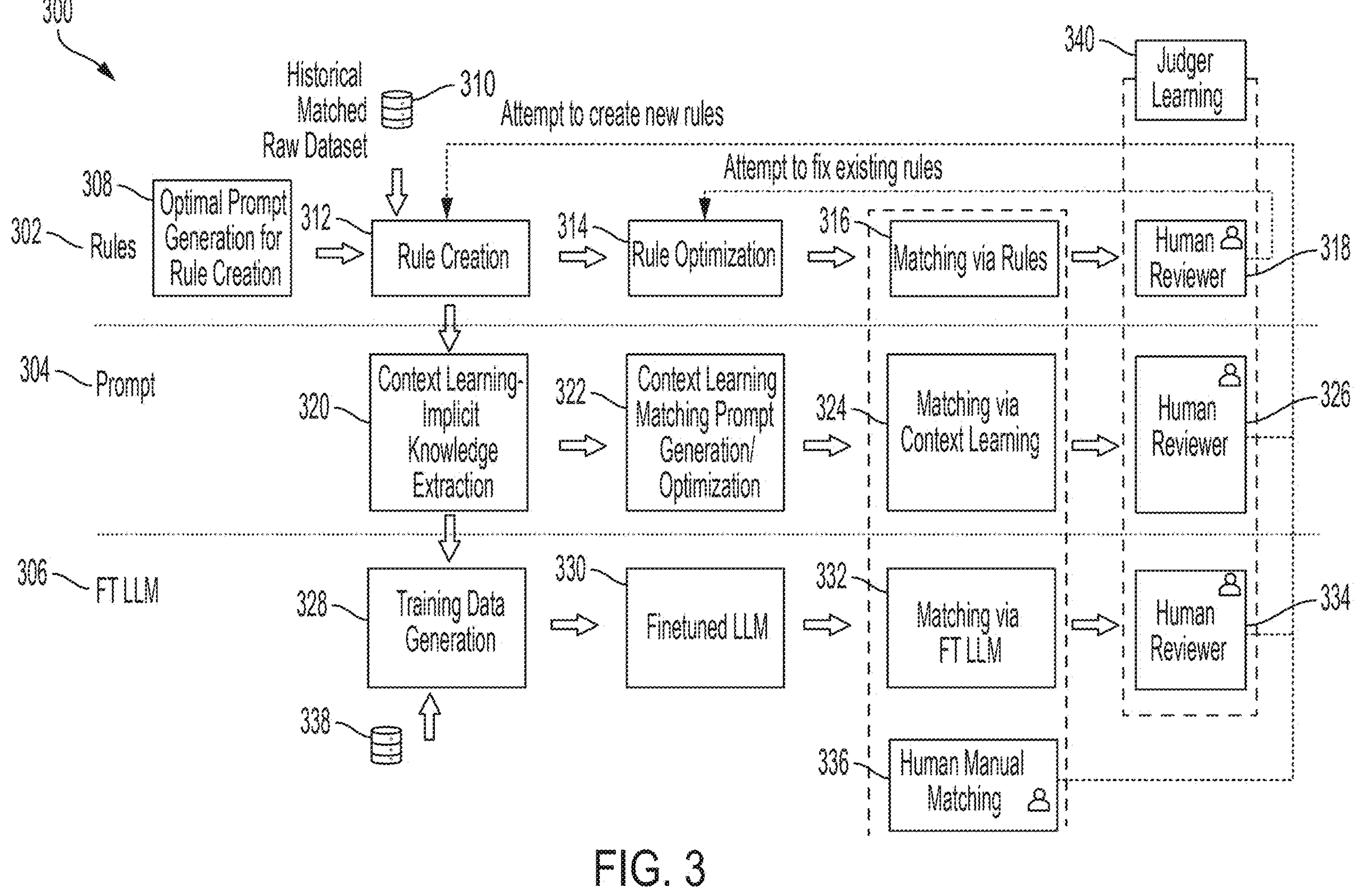
FIG. 3 is a block diagram of a system for latent model extraction and policy learning according to some embodiments of the disclosure.

Generative AI prompt and mock training data improvement may be particularly useful in the context of a larger system for latent model extraction and policy learning. For example, the system 300 of FIG. 3 may be included in and/or may include one or more generative AI applications, such as one or more LLMs. Such a system 300 may be organized in layers of rule generation and/or optimization 302, prompt generation and/or optimization 304, and fine-tuned LLM generation and/or optimization 306. Module 308 may, for example, generate one or more optimal prompts for rule creation. Such a block may include prompt and mock training data improvement as described herein, where an initial prompt is received from a user or another training source and is improved using evaluation inputs related to rule generation. Such a prompt may be provided to a rule creation module 312. The rule creation module 312 may generate one or more rules based on the received prompt for performing one or more tasks. Such rules may be further generated using a historical matched raw dataset 310, such as generated through manual human matching module 336. At rule optimization module 314, rules generated by the rule creation module 312 may be improved, such as through use of human reviewer data from a human judging system where outputs from one or more generative AI applications using the rule(s) are reviewed by a human reviewer at human reviewer module 318 to determine a quality or correctness in form and content of the outputs. For example, rules, such as initially created rules or improved rules, may be provided to a matching module 316 to perform one or more matching tasks using the rules, such as data matching tasks. The outputs of the matching module 316, and, in some embodiments, the associated rules, may be provided to a human reviewer module 318, to allow for review of matching outcomes using the rules, and the outcome of such review may be used for further rule improvement.

Likewise, rules generated by rule creation module 312 may be used by context learning implicit knowledge extraction module 320 to generate prompts and/or new rules. For example, a purely rule-based approach may suffer from unseen data weakness, and latent models may be extracted exclusively for seen datasets. A number of patterns may repeat, but there may also be new patterns that are related to but do not fully fit prior patterns. Thus, a latent model/representational structure and/or intuitive patterns may be generated based on the rules received from rule creation module 312, and other information sources.

A context learning matching prompt generation/optimization module 322 may generate LLM prompts for such context learning, based on outputs of the context learning implicit knowledge extraction module 320. For example, the context learning matching prompt generation/optimization module 322 may use the rules to iteratively generate, such as through use of the prompt and training data improvement and optimization techniques described herein, prompts articulating the latent principles present in the ruleset. Such prompts may be provided to a matching module 324, for performing matching using the prompts, such as in a generative AI or LLM application. The outputs of the matching module 324 may be provided to a human reviewer module 326 for human review, and the human review outputs, such as indications of whether a format and/or content of the matching is or is not correct, along with the generated context learning matching prompts, may be provided to rule creation module 312 for further rule creation using the outputs.

A training data generation module 328 may further generate and/or improve labeled or mock training data, such as using the techniques described herein. Such training data may receive input training data from a source 338, such as a training dataset. The generated/improved training data may be used to train a finetuned LLM, at finetuned LLM module 330. The finetuned LLM module 330 may, in some examples, be finetuned for matching tasks at its initialization in the system 300. In some examples, the finetuned LLM module 330 may become finetuned through training using training data generation module 328, such as training data generated based on generated prompts, optimized prompts, generated rules, matching outcomes using generated rules, human reviewer analysis of matching outputs, and other training data. As one particular example, data generated in the rules layer 302, the prompt layer 304, and the finetuned LLM layer 306 may be used to train the finetuned LLM 330 to enable the finetuned LLM to efficiently perform matching operations using a database of rules and/or other information. The finetuned LLM module 330 may be used to perform matching of datasets at matching module 332. The outputs of matching module 332 may be provided to human review module 334, and the outputs of the human review module 334 may be further used in rule creation by rule creation module 312. Similarly, a manual human matching module 336 may be used to match datasets, and such outputs may also be used in rule creation by rule creation module 312.

The manual human reviewer modules 318, 326, and 334 may be part of a judger learning subsystem 340, which may aggregate human review of matching outputs. The judger learning subsystem 340 may determine, based on outputs of human reviewer modules 318, whether a human reviewer is likely to judge an output as correct or incorrect. Thus, human reviewer modules 318 may be supplemented and/or replaced by the judger learning subsystem 340 through an iterative process based on a confidence level of the judger learning subsystem 340 that a human reviewer would judge a matching output as correct or incorrect. Thus, rules may be generated, discovered, improved, and judged, and prompts and training data sets may be improved for latent model extraction and policy learning.

Figure 4:
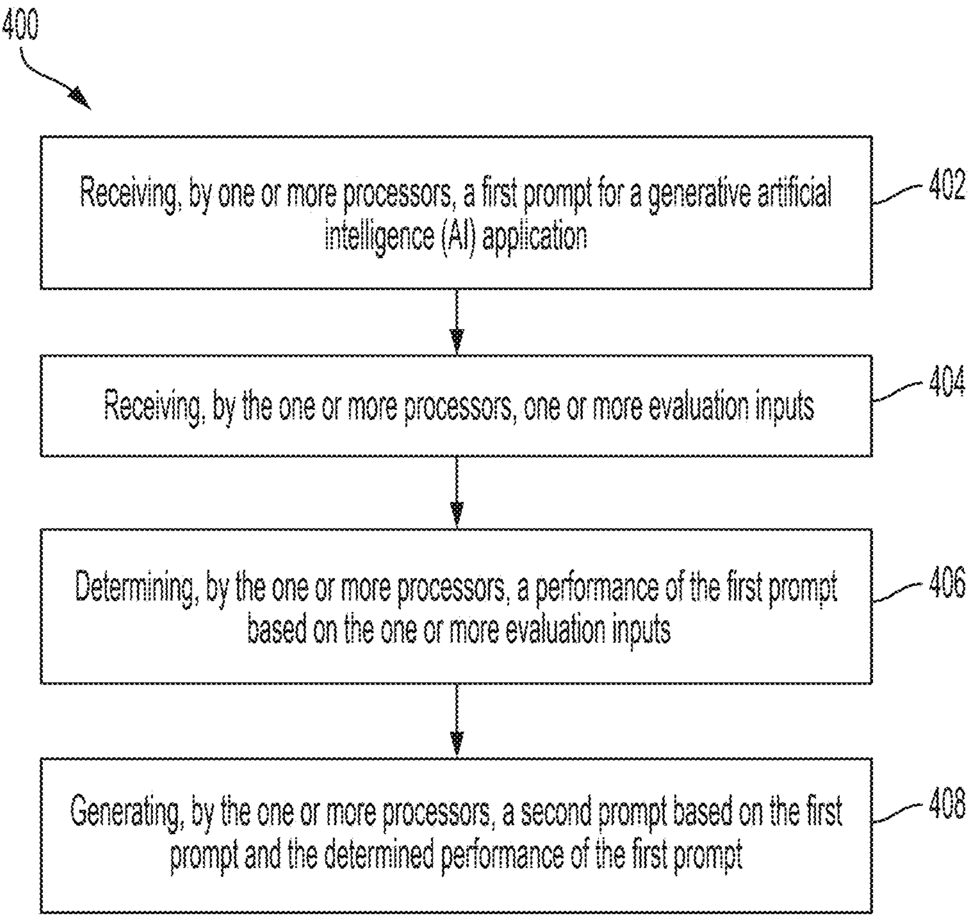
FIG. 4 is a flow chart of an example method for generative AI prompt improvement according to some embodiments of the disclosure.

A flow chart of an example method 400 for generative AI prompt improvement is shown in FIG. 4. One or more operations of the method 400 may be performed by the processor(s) 712 of FIG. 7. At block 402, a first prompt for a generative AI application may be received by one or more processors. Such a prompt may be input by a user, generated by an application, accessed in a database, or otherwise received. The prompt may, for example, be an LLM prompt, and the application may be an LLM application.

At block 404, one or more evaluation inputs for evaluating the prompt may be received by the one or more processors. Such evaluation inputs may include a task description, such as a task the prompt is intended to achieve, one or more input output/pairs, such as one or more training prompts and one or more training outputs associated with the one or more training prompts, and other data. For example, the one or more evaluation inputs may include a third prompt and one or more outputs associated with the third prompt. In some examples, the evaluation data may include labeled data generated through evaluation by one or more human operators. In some examples, the evaluation data may include mock training data generated by a mock training data algorithm using a more limited labeled training data set.

At block 406, a performance of the first prompt may be determined by the one or more processors based on the one or more evaluation inputs. For example, the prompt may be provided to the generative AI application and one or more outputs may be generated by the generative AI application based on the prompts. As another example, a predicted output of the generative AI application may be generated based on the first prompt. For example the task description and the one or more input/output pairs may be compared with the first prompt and one or more predicted or generated outputs. In some aspects a score and/or a categorization may be assigned to the first prompt based on the determination of the performance. For example, the closer a form and/or content of the predicted or generated output associated with the prompt is to a correct and/or desired output, the higher the score the prompt may receive. In some examples, if a score of the prompt is above or at a threshold level, the prompt may be categorized as optimized, and the operations of block 408 may be skipped. In some examples, if a score of the prompt is below a threshold level, the prompt may be categorized as not optimized, and the operations of block 408 may be performed with respect to the prompt.

At block 408, a second prompt may be generated based on the first prompt and the determined performance of the first prompt. The second prompt may be a second LLM prompt. For example, the second prompt may be generated to have a higher predicted performance evaluation than the first prompt based on the evaluation of the first prompt. In some examples, the method 400 may then proceed repeat block 406 with respect to the second prompt, with determination of a performance of the second prompt. In some aspects, the operations of blocks 406 and 408 may be repeated until a prompt having a score at or above a threshold level is generated and evaluated at block 406.

Figure 5:
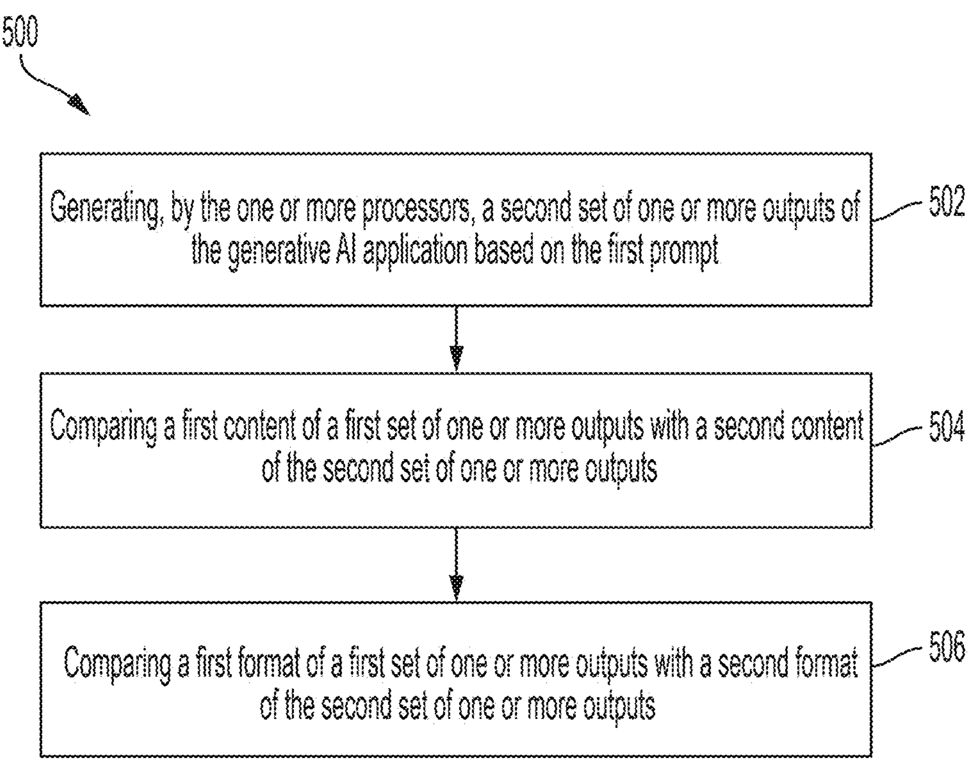
FIG. 5 is a flow chart of an example method for generative AI prompt improvement according to some embodiments of the disclosure.

A flow chart of an example method 500 for determining a performance of a prompt is shown in FIG. 5. One or more operations of the method 500 may be performed by the processor(s) 712 of FIG. 7. The operations of the method 500 may be performed as part of determining a performance of the first prompt at block 400 of FIG. 4. At block 502, a second set of one or more outputs of the generative AI application may be generated, by the one or more processors, based on the first prompt. For example, the prompt may be provided to the generative AI application, and the generative AI application may generate one or more outputs based on the prompt. As another example, one or more predicted outputs of the generative AI application may be generated based on the first prompt. A first set of one or more outputs may, for example, be received in the one or more evaluation inputs received at block 404 of the method 400.

At block 504, a first content of the first set of one or more outputs, such as outputs of the evaluation data, may be compared with a second content of the set of one or more outputs, generated based on the first prompt. A high similarity in content between the first set and the second set may result in a higher performance score for the first prompt, while a lower similarity may result in a lower score.

At block 506, a first format of the first set of one or more outputs, such as outputs of the evaluation data, may be compared with a second format of the second set of one or more outputs, generated based on the first prompt. A high similarity in format between the first set and the second set may result in a higher performance score for the first prompt, while a lower similarity may result in a lower score. Thus, determining a performance of a prompt may include comparing a format and content of outputs generated based on the prompt with format and content of training outputs. The operations of blocks 502-506 may be performed on multiple successive versions of a prompt generated through an iterative process until a prompt is determined to meet a performance threshold.

Figure 6:
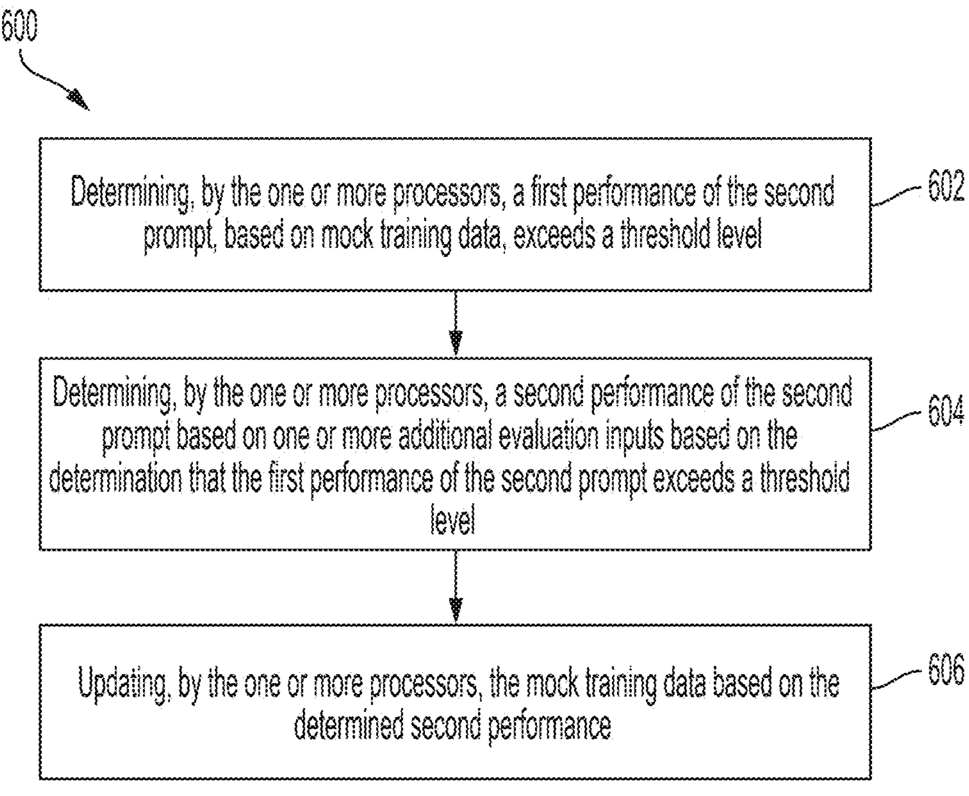
FIG. 6 is a flow chart of an example method for generative AI prompt and training data improvement according to some embodiments of the disclosure.

In some examples, mock training data may be included in prompt evaluation data and used to evaluate prompts. Mock training data may be improved through an iterative process. A flow chart of an example method 600 for generative AI prompt and testing data improvement is shown in FIG. 6. One or more operations of the method 600 may be performed by the processor(s) 712 of FIG. 7. The operations of the method 600 may, for example, be performed following or accompanying the operations of the method 400. At block 602, the one or more processors may determine a first performance of the second prompt, based on mock training data, exceeds a threshold level. For example, the mock training data may be received as evaluation inputs at block 404 of the method 400 and may be used to evaluate the first prompt, at block 406. If the first prompt fails to meet the evaluation threshold, a second prompt, such as an improved prompt, may be generated at block 408. A performance of the second prompt may then be determined, at block 602 based on the mock training data, to exceed the threshold level. In some examples, the prompt may go through multiple iterations of improvement before a performance of the improved prompt is determined to exceed the threshold level.

At block 604, a second performance of the second prompt may be determined based on one or more additional evaluation inputs, based on the determination that the first performance of the second prompt exceeds a threshold level. For example, when the improved prompt is determined to exceed a performance threshold, the prompt may then be re-evaluated using additional evaluation inputs, such as a labeled training data set. In some aspects, a performance threshold used for evaluation of the prompt using the labeled training data may be different from a performance threshold used for evaluation of the prompt using mock training data. The labeled training data set may, for example, be held in reserve, until a performance of a prompt generated using the mock training data is determined to have exceeded a threshold level.

At block 606, the mock training data may be updated based on the determined second performance. For example, if the prompt is determined to meet the performance threshold using the additional evaluation inputs, the prompt may be output to a user and the iterative prompt and data improvement process may conclude. In some aspects, the mock training data may be improved for efficient generation of future improved prompts based on the success in generating the current improved prompt. If the prompt is determined to fail to meet the performance threshold using the additional evaluation inputs, an updated set of mock training data may be generated based on the failure. Then, the iterative process of prompt improvement may continue using the updated set of mock training data, such as by returning to evaluation of the prompt using the mock training data at block 406. Thus, in some examples, such as in environment where labeled training data is limited, mock training data and a prompt may both be improved through an iterative process until a prompt meeting a desired performance threshold, when evaluated against the additional evaluation inputs, is obtained.

Figure 7:
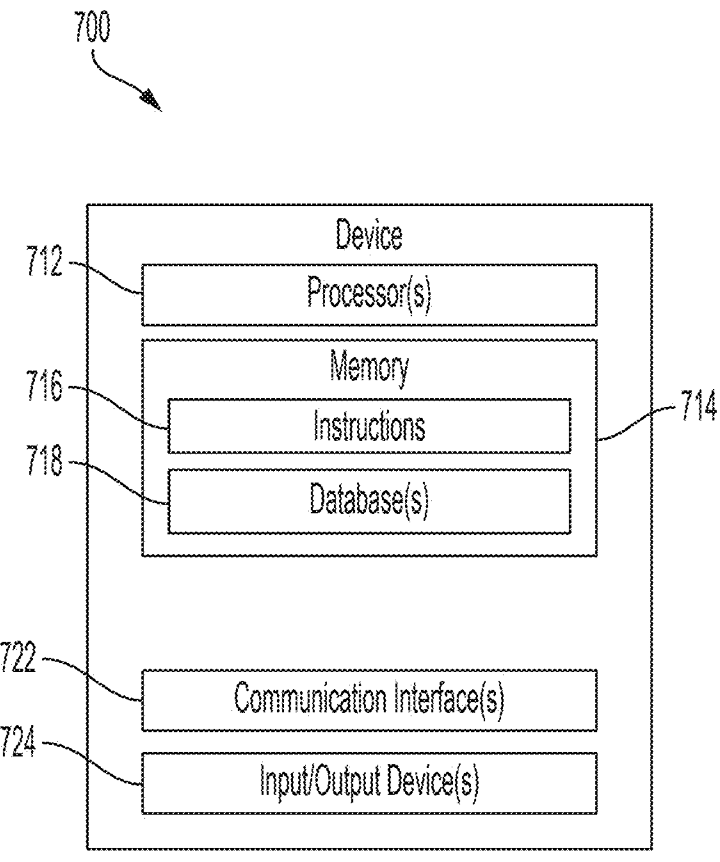
FIG. 7 is a block diagram of an example computing device for generative AI prompt and training data improvement according to some embodiments of the disclosure.

A block diagram illustrating an example computing device 700 is shown in FIG. 7. The computing device 700 may, for example, be configured to implement part or all of the systems shown in FIGS. 1-3 and to perform one or more operations described with respect to FIGS. 4-6. In an example, the functionality described with respect to the device 700 may be implemented via a cloud, via a server, or via another type of computing device or multiple types of computing devices. In some aspects, multiple devices 700 may be used by users to enter prompts and/or utilize generative AI applications, as described herein. Such prompts may be received by a device 700 and may be analyzed for risk, topic, and group utilization determination, as described herein. The device 700 includes one or more processors 712, a memory 714, one or more communication interfaces 722, and one or more input/output (I/O) devices 724. Each of the one or more processors 712 may be a central processing unit (CPU), a graphics processing unit (GPU), or other computing circuitry (e.g., a microcontroller, one or more application specific integrated circuits (ASICs), and the like) and each processor 712 may have one or more processing cores. The memory 704 may include read only memory (ROM) devices, random access memory (RAM) devices, one or more hard disk drives (HDDs), flash memory devices, solid state drives (SSDs), network attached storage (NAS) devices, other devices configured to store data in a persistent or non-persistent state, or a combination of different memory devices. The memory 704 may store instructions 716 that, when executed by the one or more processors 712, cause the one or more processors 712 to perform the operations described with reference to FIGS. 1-6. The one or more communication interfaces 722 may be configured to communicatively couple the device 700 to one or more networks via wired or wireless communication links according to one or more communication protocols or standards (e.g., an Ethernet protocol, a transmission control protocol/internet protocol (TCP/IP), an institute of electrical and electronics engineers (IEEE) 802.11 protocol, and an IEEE 802.16 protocol, a 3rd Generation (3G) communication standard, a 4th Generation (4G)/long term evolution (LTE) communication standard, a 5th Generation (5G) communication standard, and the like). The I/O devices 724 may include one or more display devices, a keyboard, a stylus, one or more touchscreens, a mouse, a trackpad, a camera, one or more speakers, haptic feedback devices, or other types of devices that enable a user to receive information from or provide information to the device 700.

The schematic or flow chart diagrams of FIGS. 4-6 are generally set forth as logical flow chart diagrams. As such, the depicted order and labeled steps are indicative of examples of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Machine learning models, as described herein, may include logistic regression techniques, linear discriminant analysis, linear regression analysis, artificial neural networks, machine learning classifier algorithms, or classification/regression trees in some embodiments. In various other embodiments, machine learning systems may employ Naive Bayes predictive modeling analysis of several varieties, learning vector quantization artificial neural network algorithms, or implementation of boosting algorithms such as AdaBoost or stochastic gradient boosting systems for iteratively updating weighting to train a machine learning classifier to determine a relationship between an influencing attribute, such as received device data, and a system, such as an environment or particular user, and/or a degree to which such an influencing attribute affects the outcome of such a system or determination of environment.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Clause 1: A method, comprising: receiving, by one or more processors, a first prompt for a generative artificial intelligence (AI) application; receiving, by the one or more processors, one or more evaluation inputs; determining, by the one or more processors, a performance of the first prompt based on the one or more evaluation inputs; and generating, by the one or more processors a second prompt based on the first prompt and the determined performance of the first prompt.

Clause 2: The method of clause 1, wherein the generative AI application comprises a large language model (LLM) application, the first prompt comprises a first LLM prompt, and the second prompt comprises a second LLM prompt.

Clause 3: The method of clause 1, wherein the one or more evaluation inputs comprise a third prompt and a first set of one or more outputs associated with the third prompt.

Clause 4: The method of clause 3, wherein determining the performance of the first prompt comprises: generating, by the one or more processors a second set of one or more outputs of the generative AI application based on the first prompt; comparing, by the one or more processors, a first content of the first set of one or more outputs with a second content of the second set of one or more outputs; and comparing, by the one or more processors, a first format of the first set of one or more outputs with a second format of the second set of one or more outputs.

Clause 5: The method of clause 1, wherein the one or more evaluation inputs comprise mock training data, and wherein receiving the one or more evaluation inputs comprises generating the mock training data.

Clause 6: The method of clause 5, further comprising: determining, by the one or more processors, a first performance of the second prompt, based on the mock training data, exceeds a threshold level; determining, by the one or more processors, a second performance of the second prompt based on one or more additional evaluation inputs based on the determination that the first performance of the second prompt exceeds the threshold level; and updating, by the one or more processors, the mock training data based on the determined second performance.

Clause 7: The method of clause 6, wherein the one or more additional evaluation inputs comprise labeled training data.

Clause 8: A system, comprising: a memory; and one or more processors communicatively coupled to the memory, the one or more processors configured to perform operations comprising: receiving a first prompt for a generative artificial intelligence (AI) application, receiving one or more evaluation inputs; determining a performance of the first prompt based on the one or more evaluation inputs; and generating a second prompt based on the first prompt and the determined performance of the first prompt.

Clause 9: The system of clause 8, wherein the generative AI application comprises a large language model (LLM) application, the first prompt comprises a first LLM prompt, and the second prompt comprises a second LLM prompt.

Clause 10: The system of clause 8, wherein the one or more evaluation inputs comprise a third prompt and a first set of one or more outputs associated with the third prompt.

Clause 11: The system of clause 10, wherein to determine the performance of the first prompt, the one or more processors are further configured to perform operations comprising: generating a second set of one or more outputs of the generative AI application based on the first prompt; comparing a first content of the first set of one or more outputs with a second content of the second set of one or more outputs; and comparing a first format of the first set of one or more outputs with a second format of the second set of one or more outputs.

Clause 12: The system of clause 8, wherein the one or more evaluation inputs comprise mock training data, and wherein receiving the one or more evaluation inputs comprises generating the mock training data.

Clause 13: The system of clause 12, wherein the one or more processors are further configured to perform operations comprising: determining a first performance of the second prompt, based on the mock training data, exceeds a threshold level; determining a second performance of the second prompt based on one or more additional evaluation inputs based on the determination that the first performance of the second prompt exceeds the threshold level; and updating the mock training data based on the determined second performance.

Clause 14: The system of clause 13, wherein the one or more additional evaluation inputs comprise labeled training data.

Clause 15: A non-transitory computer-readable storage medium storing instructions that, when executed by one or more processors, cause the one or more processors to perform operations comprising: receiving a first prompt for a generative artificial intelligence (AI) application, receiving one or more evaluation inputs; determining a performance of the first prompt based on the one or more evaluation inputs; and generating a second prompt based on the first prompt and the determined performance of the first prompt.

Clause 16: The non-transitory computer-readable storage medium of clause 15, wherein the generative AI application comprises a large language model (LLM) application, the first prompt comprises a first LLM prompt, and the second prompt comprises a second LLM prompt.

Clause 17: The non-transitory computer-readable storage medium of clause 15, wherein the one or more evaluation inputs comprise a third prompt and a first set of one or more outputs associated with the third prompt.

Clause 18: The non-transitory computer-readable storage medium of clause 17, further storing instructions that, when executed by the one or more processors, cause the one or more processors to determine the performance of the first prompt by performing operations comprising: generating a second set of one or more outputs of the generative AI application based on the first prompt; comparing a first content of the first set of one or more outputs with a second content of the second set of one or more outputs; and comparing a first format of the first set of one or more outputs with a second format of the second set of one or more outputs.

Clause 19: The non-transitory computer-readable storage medium of clause 15, wherein the one or more evaluation inputs comprise mock training data, and wherein receiving the one or more evaluation inputs comprises generating the mock training data.

Clause 20: The non-transitory computer-readable storage medium of clause 19, further storing instructions that, when executed by the one or more processors, cause the one or more processors to perform operations comprising: determining a first performance of the second prompt, based on the mock training data, exceeds a threshold level; determining a second performance of the second prompt based on one or more additional evaluation inputs based on the determination that the first performance of the second prompt exceeds the threshold level; and updating the mock training data based on the determined second performance.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processors are described throughout the detailed description, examples of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:

receiving, by one or more processors, a first prompt for a generative artificial intelligence (AI) application;

receiving, by the one or more processors, one or more evaluation inputs, wherein the one or more evaluation inputs comprise a first set of one or more outputs associated with a third prompt;

determining, by the one or more processors, a performance of the first prompt based on the one or more evaluation inputs, wherein determining the performance of the first prompt comprises:

generating, by the one or more processors, a second set of one or more outputs or predicted outputs of the generative AI application based on the first prompt;

comparing, by the one or more processors, a first content of the first set of one or more outputs with a second content of the second set of one or more outputs or predicted outputs; and comparing, by the one or more processors, a first format of the first set of one or more outputs with a second format of the second set of one or more outputs or predicted outputs; and generating, by the one or more processors, a second prompt based on the first prompt and the determined performance of the first prompt.

2. The method of claim 1, wherein the generative AI application comprises a large language model (LLM) application, the first prompt comprises a first LLM prompt, and the second prompt comprises a second LLM prompt.

3. The method of claim 1, wherein the one or more evaluation inputs comprise mock training data, and wherein receiving the one or more evaluation inputs comprises generating the mock training data.

4. The method of claim 3, further comprising:

determining, by the one or more processors, a first performance of the second prompt, based on the mock training data, exceeds a threshold level;

determining, by the one or more processors, a second performance of the second prompt based on one or more additional evaluation inputs based on the determination that the first performance of the second prompt exceeds the threshold level; and updating, by the one or more processors, the mock training data based on the determined second performance.

5. The method of claim 4, wherein the one or more additional evaluation inputs comprise labeled training data.

6. The method of claim 1, further comprising:

providing, by the one or more processors, the second prompt to the generative AI application; and generating, by the one or more processors executing the generative AI application, a third set of one or more outputs based on the second prompt.

7. The method of claim 1, further comprising determining a mutation rate between the first prompt and the second prompt.

8. A system, comprising:

a memory; and one or more processors communicatively coupled to the memory, the one or more processors configured to perform operations comprising:

receiving a first prompt for a generative artificial intelligence (AI) application, receiving one or more evaluation inputs, wherein the one or more evaluation inputs comprise a first set of one or more outputs associated with a third prompt;

determining a performance of the first prompt based on the one or more evaluation inputs, wherein to determine the performance of the first prompt, the one or more processors are further configured to perform operations comprising:

generating a second set of one or more outputs or predicted outputs of the generative AI application based on the first prompt;

comparing a first content of the first set of one or more outputs with a second content of the second set of one or more outputs or predicted outputs; and comparing a first format of the first set of one or more outputs with a second format of the second set of one or more outputs or predicted outputs; and generating a second prompt based on the first prompt and the determined performance of the first prompt.

9. The system of claim 8, wherein the generative AI application comprises a large language model (LLM) application, the first prompt comprises a first LLM prompt, and the second prompt comprises a second LLM prompt.

10. The system of claim 8, wherein the one or more evaluation inputs comprise mock training data, and wherein receiving the one or more evaluation inputs comprises generating the mock training data.

11. The system of claim 10, wherein the one or more processors are further configured to perform operations comprising:

determining a first performance of the second prompt, based on the mock training data, exceeds a threshold level;

determining a second performance of the second prompt based on one or more additional evaluation inputs based on the determination that the first performance of the second prompt exceeds the threshold level; and updating the mock training data based on the determined second performance.

12. The system of claim 11, wherein the one or more additional evaluation inputs comprise labeled training data.

13. The system of claim 8, wherein the one or more processors are further configured to perform operations comprising:

providing the second prompt to the generative AI application; and generating, by the generative AI application, a third set of one or more outputs based on the second prompt.

14. The system of claim 8, wherein the one or more processors are further configured to perform operations comprising determining a mutation rate between the first prompt and the second prompt.

15. A non-transitory computer-readable storage medium storing instructions that, when executed by one or more processors, cause the one or more processors to perform operations comprising:

receiving a first prompt for a generative artificial intelligence (AI) application, receiving one or more evaluation inputs, wherein the one or more evaluation inputs comprise a first set of one or more outputs associated with a third prompt;

determining a performance of the first prompt based on the one or more evaluation inputs, wherein the non-transitory computer-readable storage medium further stores instructions that, when executed by the one or more processors, cause the one or more processors to determine the performance of the first prompt by performing operations comprising:

generating a second set of one or more outputs or predicted outputs of the generative AI application based on the first prompt;

comparing a first content of the first set of one or more outputs with a second content of the second set of one or more outputs or predicted outputs; and comparing a first format of the first set of one or more outputs with a second format of the second set of one or more outputs or predicted outputs; and generating a second prompt based on the first prompt and the determined performance of the first prompt.

16. The non-transitory computer-readable storage medium of claim 15, wherein the generative AI application comprises a large language model (LLM) application, the first prompt comprises a first LLM prompt, and the second prompt comprises a second LLM prompt.

17. The non-transitory computer-readable storage medium of claim 15, wherein the one or more evaluation inputs comprise mock training data, and wherein receiving the one or more evaluation inputs comprises generating the mock training data.

18. The non-transitory computer-readable storage medium of claim 17, further storing instructions that, when executed by the one or more processors, cause the one or more processors to perform operations comprising:

determining a first performance of the second prompt, based on the mock training data, exceeds a threshold level;

determining a second performance of the second prompt based on one or more additional evaluation inputs based on the determination that the first performance of the second prompt exceeds the threshold level; and updating the mock training data based on the determined second performance.

19. The non-transitory computer-readable storage medium of claim 15, further storing instructions that, when executed by the one or more processors, cause the one or more processors to perform operations comprising:

providing the second prompt to the generative AI application; and generating, by the generative AI application, a third set of one or more outputs based on the second prompt.

20. The non-transitory computer-readable storage medium of claim 15, further storing instructions that, when executed by the one or more processors, cause the one or more processors to perform operations comprising determining a mutation rate between the first prompt and the second prompt.

* * * * *